(12) United States Patent
Lin et al.

(10) Patent No.: US 12,079,600 B2
(45) Date of Patent: Sep. 3, 2024

(54) VISUAL PROGRAMMING FOR DEEP LEARNING

(71) Applicant: Microsoft Technology Licensing, LLC, Redmond, WA (US)

(72) Inventors: Haoxiang Lin, Redmond, WA (US); Mao Yang, Redmond, WA (US); Shuguang Liu, Redmond, WA (US); Cheng Chen, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 235 days.

(21) Appl. No.: 17/615,080

(22) PCT Filed: May 6, 2020

(86) PCT No.: PCT/US2020/031544
§ 371 (c)(1),
(2) Date: Nov. 29, 2021

(87) PCT Pub. No.: WO2020/263421
PCT Pub. Date: Dec. 30, 2020

(65) Prior Publication Data
US 2022/0222049 A1  Jul. 14, 2022

(30) Foreign Application Priority Data
Jun. 28, 2019 (CN) .................. 201910578856.X (51) Int. Cl.
*G06F 8/34* (2018.01)
*G06F 3/0486* (2013.01)
*G06N 3/082* (2023.01)

(52) U.S. Cl.
CPC .............. *G06F 8/34* (2013.01); *G06F 3/0486* (2013.01); *G06N 3/082* (2013.01)

(58) Field of Classification Search
None
See application file for complete search history.

(56) References Cited

U.S. PATENT DOCUMENTS 5,222,210 A * 6/1993 Leivian .................. G06N 3/105
706/11
8,627,276 B2 1/2014 Lin et al.
(Continued)

FOREIGN PATENT DOCUMENTS

CN 103793054 A 5/2014
CN 108319456 A 7/2018
(Continued)

OTHER PUBLICATIONS

"Deep Learning Studio", Retrieved from: http://web.archive.org/web/20180905104555/https://deepcognition.ai/features/deep-learning-studio/, Sep. 5, 2018, 6 Pages.
(Continued)

*Primary Examiner* — Qing Chen
(74) *Attorney, Agent, or Firm* — Schwegman Lundberg & Woessner, P.A.

(57) ABSTRACT

Implementations of the present disclosure relate to visual programming for deep learning. A computer-implemented method comprises presenting a visual representation of an artificial neural network, the visual representation comprising graphical elements representing layers of the artificial neural network; in response to receiving a drag-and-drop operation on the graphical elements, modifying an intermediate representation of the artificial neural network, wherein the intermediate representation is independent of a deep learning framework and the drag-and-drop operation is configured to modify connections between the graphical elements; and modifying, based on the intermediate repre-
(Continued)

sentation of the artificial neural network, code of the artificial neural network for a target deep learning framework.

13 Claims, 4 Drawing Sheets

(56) References Cited

U.S. PATENT DOCUMENTS

| | | | |
|---|---|---|---|
| 9,846,836 | B2 | 12/2017 | Gao et al. |
| 9,934,462 | B1* | 4/2018 | Healey .................. G06N 3/045 |
| 2003/0110464 | A1 | 6/2003 | Davidson |
| 2007/0094168 | A1 | 4/2007 | Ayala et al. |
| 2007/0236509 | A1* | 10/2007 | Eldridge ............... G06F 3/0486 |
| | | | 345/619 |
| 2017/0351401 | A1* | 12/2017 | Pascale .................. G06N 20/00 |
| 2018/0307978 | A1 | 10/2018 | Ar |
| 2019/0205728 | A1* | 7/2019 | Feng ........................ G06N 3/04 |
| 2019/0220253 | A1* | 7/2019 | Pradhan .................. G06N 3/08 |

FOREIGN PATENT DOCUMENTS

| | | |
|---|---|---|
| CN | 109241141 A | 1/2019 |
| WO | 2017138220 A1 | 8/2017 |

OTHER PUBLICATIONS

"Designing Efficient Data Loaders for Deep Learning", Retrieved from: http://web.archive.org/web/20190125060743/https://mxnet.incubator.apache.org/versions/master/architecture/note_data_loading.html, Jan. 25, 2019, 10 Pages.

"DL-IDE—A Visual IDE for Deep Learning", Retrieved from: https://goodboyanush.github.io/blogs/dlide_cats_dogs.html, Retrieved Date: Dec. 2, 2021, 3 Pages.

"Electron", Retrieved from: https://web.archive.org/web/20190420074734/https://electronjs.org/, Apr. 20, 2019, 7 Pages.

"Lobe", Retrieved from: http://web.archive.org/web/20190403175150/https://lobe.ai/, Apr. 3, 2019, 8 Pages.

Wongsuphasawat, et al., "Visualizing Dataflow Graphs of Deep Learning Models in TensorFlow", In Journal of IEEE Transactions on Visualization and Computer Graphics, vol. 24, Issue 1, Aug. 29, 2017, 12 Pages.

"React", Retrieved from: https://web.archive.org/web/20190421232812/https://reactjs.org/, Apr. 21, 2019, 5 Pages.

"Usage with React", Retrieved from: https://web.archive.org/web/20181126234730/https:/redux.js.org/basics/usagewithreact, Nov. 26, 2018, 13 Pages.

Cope, et al., "SpineCreator: A Graphical User Interface for the Creation of Layered Neural Models", In Publication of Neuroinformatics, vol. 15, Issue 1, Jan. 1, 2017, pp. 25-40.

Drossu, et al., "A Flexible Graphical user Interface for Embedding Heterogeneous Neural Network Simulators", In Proceedings of IEEE Transactions on Education, vol. 39, Issue: 3, Aug. 1996, pp. 367-374.

"International Search Report and Written Opinion Issued in PCT Application No. PCT/US2020/031544", Mailed Date: Oct. 2, 2020, 16 Pages.

Office Action Received for Chinese Application No. 201910578856.X, mailed on Feb. 6, 2024, 13 pages (English Translation Provided).

First Examination Report received in Indian Application No. 202117058436, mailed on Nov. 16, 2023, 6 pages.

Chen, et al., "TVM: An end to end IR stack for deploying deep learning workloads on hardware platforms", tvm.ai/2017/08/17/tvm-release-announcement.html, Aug. 17, 2017, 5 pages.

Office Action Received for Japanese Application No. 2021-568242, mailed on Apr. 5, 2024, 6 pages (English Translation Provided).

* cited by examiner

VISUAL PROGRAMMING FOR DEEP LEARNING

CROSS-REFERENCE TO RELATED APPLICATION

This application is a U.S. National Stage Filing under 35 U.S.C. 371 of International Patent Application Serial No. PCT/US2020/031544, filed May 6, 2020, and published as WO 2020/263421 A1 on Dec. 30, 2020, which claims priority to Chinese Application No. 201910578856.X, filed Jun. 28, 2019, which applications and publication are incorporated herein by reference in their entirety.

BACKGROUND

Developers learning and using deep learning programming have increased with extensive application of deep learning. However, in the current procedure of deep learning programming, the developers need to write lots of code to pre-process data and build a deep learning model. Beginners usually are overwhelmed with the massive underlying code and thus can hardly understand and grasp the deep learning programming in a rapid way.

SUMMARY

A computer-implemented method comprises presenting a visual representation of an artificial neural network, the visual representation comprising graphical elements representing layers of the artificial neural network; in response to receiving a drag-and-drop operation on the graphical elements, modifying an intermediate representation of the artificial neural network, wherein the intermediate representation is independent of a deep learning framework and the drag-and-drop operation is configured to modify connections between the graphical elements; and modifying, based on the intermediate representation of the artificial neural network, code of the artificial neural network for a target deep learning framework.

This Summary is provided to introduce inventive concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference signs refer to the same or similar elements.

DETAILED DESCRIPTION

The present disclosure will now be discussed with reference to several example implementations. It is to be understood these implementations are discussed only for the purpose of enabling those skilled persons in the art to better understand and thus implement the present disclosure, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

Figure 1:
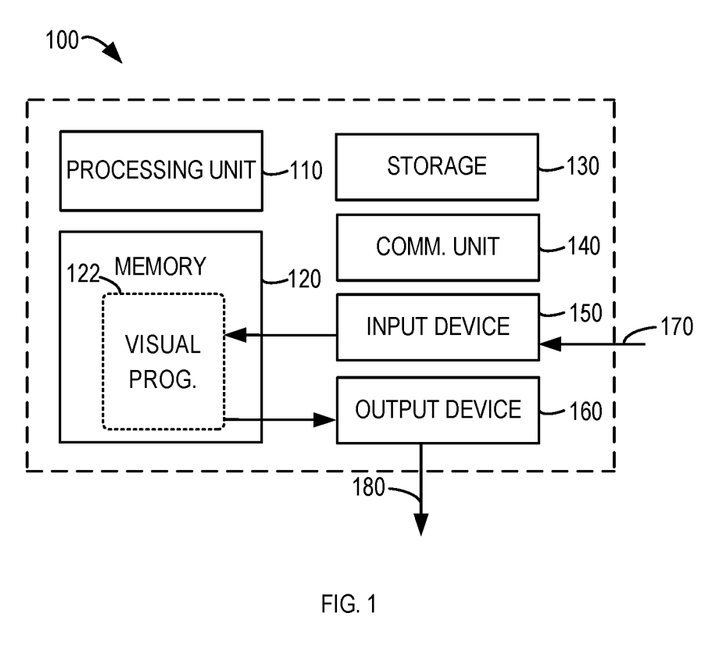
FIG. 1 illustrates a block diagram of a computing device where implementations of the present disclosure can be implemented.

Basic principles and several examples of the present disclosure are explained below with reference to the drawings. FIG. 1 illustrates a block diagram of a computing device 100 that can carry out implementations of the present disclosure. It should be understood that the computing device 100 shown in FIG. 1 is only exemplary and shall not constitute any restrictions over functions and scopes of the implementations described by the present disclosure. According to FIG. 1, the computing device 100 may be implemented by a general purpose computing device or a dedicated computing device. Components of the computing device 100 can include, but not limited to, one or more processors or processing units 110, memory 120, storage device 130, one or more communication units 140, one or more input devices 150 and one or more output devices 160.

In some implementations, the computing device 100 can be implemented as various user terminals or service terminals with computing power. The service terminals can be servers, large-scale computing devices and the like provided by a variety of service providers. The user terminal, for example, is mobile terminal, fixed terminal or portable terminal of any types, including mobile phone, site, unit, device, multimedia computer, multimedia tablet, Internet nodes, communicator, desktop computer, laptop computer, notebook computer, netbook computer, tablet computer, Personal Communication System (PCS) device, personal navigation device, Personal Digital Assistant (PDA), audio/video player, digital camera/video, positioning device, television receiver, radio broadcast receiver, electronic book device, gaming device or any other combinations thereof consisting of accessories and peripherals of these devices or any other combinations thereof. It can also be predicted that the computing device 100 can support any types of user-specific interfaces (such as "wearable" circuit and the like).

The processing unit 110 can be a physical or virtual processor and can execute various processing based on the programs stored in the memory 120. In a multi-processor system, a plurality of processing units executes computer-executable instructions in parallel to enhance parallel processing capability of the computing device 100. The processing unit 110 also can be known as central processing unit (CPU), microprocessor, controller and microcontroller. In addition, the processing unit 110 also may be implemented as Graphical Processing Unit (GPU) for executing parallel computation like compute-intensive processing and the like.

The computing device 100 usually includes a plurality of computer storage media. Such media can be any attainable media accessible by the computing device 100, including but not limited to volatile and non-volatile media, removable and non-removable media. The memory 120 can be a volatile memory (e.g., register, cache, Random Access Memory (RAM)), a non-volatile memory (such as, Read-Only Memory (ROM), Electrically Erasable Programmable Read-Only Memory (EEPROM), flash), or any combinations thereof. The memory 120 can include a visual programming module 122 configured to execute functions of various implementations described herein. The visual programming module 122 can be accessed and operated by the processing unit 110 to perform corresponding functions.

The storage device 130 can be removable or non-removable medium, and can include machine readable medium, which can be used for storing information and/or data and can be accessed within the computing device 100. The computing device 100 can further include a further removable/non-removable, volatile/non-volatile storage medium. Although not shown in FIG. 1, there can be provided a disk drive for reading from or writing into a removable and non-volatile disk and an optical disk drive for reading from or writing into a removable and non-volatile optical disk. In such cases, each drive can be connected via one or more data medium interfaces to the bus (not shown).

The communication unit 140 implements communication with another computing device through communication media. Additionally, functions of components of the computing device 100 can be realized by a single computing cluster or a plurality of computing machines, and these computing machines can communicate through communication connections. Therefore, the computing device 100 can be operated in a networked environment using a logic connection to one or more other servers, a Personal Computer (PC) or a further general network node.

The input device 150 can be one or more various input devices, such as mouse, keyboard, trackball, voice-input device and the like. The output device 160 can be one or more output devices, e.g., display, loudspeaker and printer etc. The computing device 100 also can communicate through the communication unit 140 with one or more external devices (not shown) as required, wherein the external device, e.g., storage device, display device etc., communicates with one or more devices that enable the users to interact with the computing device 100, or with any devices (such as network card, modem and the like) that enable the computing device 100 to communicate with one or more other computing devices. Such communication can be executed via Input/Output (I/O) interface (not shown).

In some implementations, apart from being integrated on an individual device, some or all of the respective components of the computing device 100 also can be set in the form of cloud computing architecture. In the cloud computing architecture, these components can be remotely arranged and can cooperate to implement the functions described by the present disclosure. In some implementations, the cloud computing provides computation, software, data access and storage services without informing a terminal user of physical positions or configurations of systems or hardware providing such services. In various implementations, the cloud computing provides services via Wide Area Network (such as Internet) using a suitable protocol. For example, the cloud computing provider provides, via the Wide Area Network, the applications, which can be accessed through a web browser or any other computing components. Software or components of the cloud computing architecture and corresponding data can be stored on a server at a remote position. The computing resources in the cloud computing environment can be merged or spread at a remote datacenter. The cloud computing infrastructure can provide, via a shared datacenter, the services even though they are shown as a single access point for the user. Therefore, components and functions described herein can be provided using the cloud computing architecture from a service provider at a remote position. Alternatively, components and functions also can be provided from a conventional server, or they can be mounted on a client device directly or in other ways.

The computing device 100 may be used for implementing a visual programming scheme in accordance with implementations of the present disclosure. For example, the computing device 100 may display, on a monitor, a visual representation of an artificial neural network, such as various layers and connections between the layers. The computing device 100 may receive via the input device 150 a user input, e.g., a drag-and-drop operation. For example, the user may drag and drop one layer onto a canvas. The visual programming module 122 may modify the presented visual representation based on the user input and further update code associated with the artificial neural network. The code may be provided to the output device 160 as output 180 for the user. For example, the code may be presented to the user on the display together with the visual representation.

Figure 2:
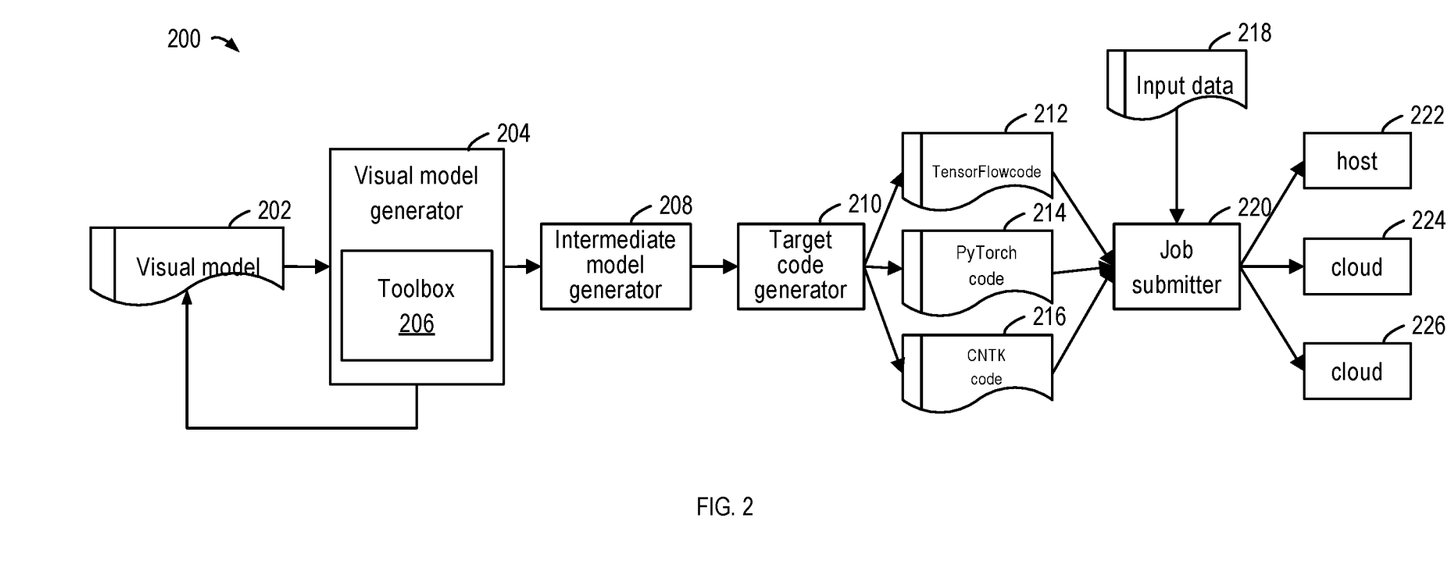
FIG. 2 illustrates a schematic diagram of visual programming architecture in accordance with implementations of the present disclosure.

FIG. 2 illustrates a schematic diagram of visual programming architecture 200 in accordance with some implementations of the present disclosure. For example, the architecture 200 may be implemented by the computing device 100 shown in FIG. 1, particularly by the visual programming module 122. However, it should be understood that the architecture 200 may also be implemented on any other suitable devices.

As shown in FIG. 2, the visual model editor 204 may load a visual model 202, which may be edited and saved by a developer using the visual model editor 204 or shared by other developers. The visual model 202 may be saved in the form of a description file or in other suitable forms. Alternatively, the developer also may edit the visual model with the visual model editor 204 from the very beginning.

Figure 3:
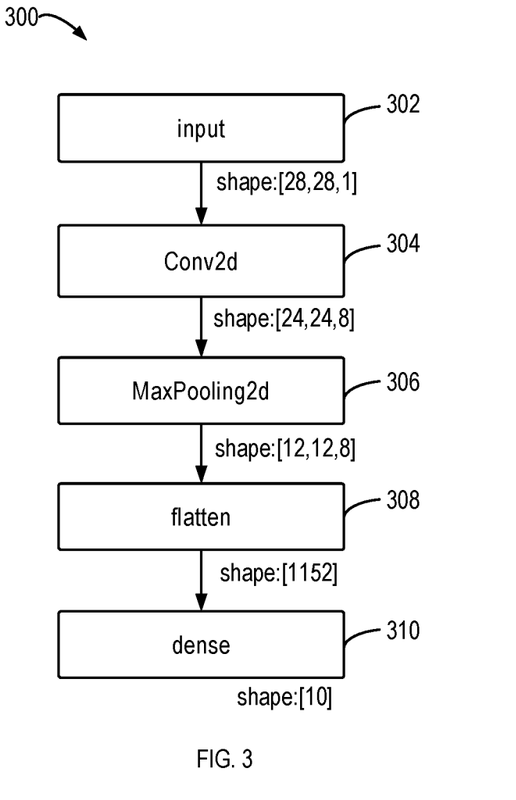
FIG. 3 illustrates a schematic diagram of a visual representation of an artificial neural network in accordance with implementations of the present disclosure.

For example, the visual model editor 204 may include a canvas of the deep learning visual model that can be edited by the developers through operations like drag-and-drop. Drag-and-drop is a common operation in the graphical user interface and the users may conveniently edit connections between the graphical elements via the drag-and-drop operation. For example, the users may drag and drop one graphical element to or from an input of another graphical element. FIG. 3 illustrates a schematic diagram of a visual representation 300 of the artificial neural network in accordance with some implementations of the present disclosure. The visual representation 300 may be displayed on the canvas of the visual model editor 204 and includes graphical elements representing respective layers of the artificial neural network, for example, graphical user interface elements capable of interacting with the developers. For example, the developers may click a graphical interface element to modify parameters of each layer like shape (also known as data dimension), kernel size and activation function etc. Here, the parameters denote one or more modifiable attributes of respective layers.

As shown in FIG. 3, the graphical element 302 represents the input layer, the graphical element 304 indicates a two-dimensional convolutional layer, the graphical element 306 denotes a two-dimensional max pooling layer, the graphical element 308 represents flattened layer and the graphical element 310 indicates a fully-connected layer. Shapes of respective layers are also illustrated at each graphical element. For example, the raw data shape of the input layer is [28, 28, 1], i.e., a tensor of 28×28×1.

It should be appreciated that the term "layer" here not only includes processing layers of the artificial neural network (such as convolutional layer, fully connected layer and pooling layer), but also contains structured input/output, for example, the input layer denoted by the graphical element 302 in FIG. 3. In addition, the processing layers of the artificial neural network usually include a plurality of sets of operators. For example, the fully connected layer may include a combination of matrix multiplication and additive operation. Therefore, the term "layer" here also may consist of computing elements that are more fundamental than the common processing layers, i.e., operators like matrix multiplication.

The visual representation 300 not only includes multiple graphical elements, but also the connections between the graphical elements, thereby forming the visual representation of a corresponding model as a whole.

By means of graphical illustration, the developers can quite easily modify the parameters of the respective layers and the connections therebetween. For example, when the developers are editing the visual representation 300, the visual model editor 204 may determine the shape of each layer. Based on these shape parameters, it is validated whether the shape of each layer in the artificial neural network matches with one another. For example, if the two layers do not match in shape, an error indication may be displayed in the visual representation 300; the visual programming tool may validate the artificial neural network immediately after changes in the shape of any layers and/or in the connections between any graphical elements, to find the issue of the model as soon as possible.

In some implementations, the user may drag and drop the first graphical element to the second graphical element to connect the first graphical element to the second graphical element. The output of the first graphical element is provided to the input of the second graphical element, which means that the output data dimension of the first graphical element should match the input data dimension of the second graphical element; otherwise, an error occurs in the artificial neural network. Moreover, the visual editor 204 may automatically connect the graphical elements based on their respective shapes. For example, when the user adds a new graphical element, the new graphical element may be automatically connected to a graphical element having a matching shape.

In the example as shown in FIG. 3, if the user modifies the data dimension of the input layer denoted by the graphical element 302, the visual model editor 204 may compare the data dimension of the input layer with the input data dimension of the convolutional layer represented by the graphical element 304 to validate whether the shapes of the two layers match with each other.

In some implementations, if the user modifies the data dimension of the input layer denoted by the graphical element 302, the visual model editor 204 may correspondingly adjust the input data dimension of the convolutional layer represented by the graphical element 304 to the data dimension of the input layer denoted by the graphical element 302. In addition, the visual model editor 204 may also validate whether the output data dimension of the convolutional layer represented by the graphical element 304 matches with the max pooling layer denoted by the graphical element 306.

In some implementations, the visual model editor 204 may provide a predefined set of layers of the artificial neural network. The structured layers may be organized into a plurality of tool box panels, such as input/output, Convolutional Neural Network (CNN), Recurrent Neural Network (RNN), fully connected layer, tensor operation and the like. Developers may select from the tool box panels desired structured layers based on the requirements to build an artificial neural network model. For example, the interface of the visual model editor 204 may also include a search option, which supports search for specific layers and allows the user to drag and drop a layer matching with the search onto the canvas.

In some implementations, the developers may save the artificial neural network model or the visual model for subsequent call. These models may be saved in the form of description file or in any other suitable forms. The saved visual model also may be shared with other developers for use.

In some implementations, the interface of the visual model editor 204 may also include a data interface for previewing datasets. For example, there may be provided with some public data, such as public datasets, and also a data import interface, through which the developers upload local datasets for training. After the developers choose a specific dataset, the visual model editor 204 may load the dataset and display the dataset and/or related information. For example, the total sample size of the dataset, the sample size of the training set and the sample size of the test set may be all displayed on the interface. For example, a uniform user interface may be provided for the public data and the local data, such that the users can quickly import their own data. The users may preview the uploaded data, train the model and perform inference from the trained model.

As shown in FIG. 2, when the developers modify the visual representation of the artificial neural network, the intermediate model generator 208 may immediately convert the visual representation into an intermediate representation independent of deep learning frameworks. The intermediate representation may correspond to the visual representation 300 and indicate the parameters and name for each graphical element. For example, the intermediate representation may include specification description like parameters and name for the predefined graphical element. The description is independent of the deep learning frameworks. In general, deep learning frameworks have respective specific specifications for the layers of the artificial neural network. Under different deep learning frameworks, specific layers of the artificial neural network and specification for the specific layers such as parameters and names also vary.

The intermediate representation may be embodied in the form of an intermediate calculation chart and each node may correspond to one graphical element in the visual representation. The intermediate calculation chart may describe the artificial neural network as a directed graph independent of the deep learning frameworks. There may not be a one-to-one correspondence between the nodes and the layers of the deep learning framework. For example, one node may correspond to multiple layers in the deep learning framework or multiple nodes may correspond to one layer in the deep learning framework.

In some implementations, an edited or modified artificial neural network model may also be validated via the intermediate model generator 208 and a related error is indicated at respective graphical elements via the visual model editor 204. In the example of FIG. 3, if the user modifies the data dimension of the input layer denoted by the graphical element 302, the intermediate model generator 208 may acquire the input data dimension of the convolutional layer indicated by the graphical element 304 and compare the data dimension of the input layer with the data dimension of the convolutional layer to validate whether their shapes match with each other.

In some further implementations, if the user modifies the data dimension of the input layer denoted by the graphical element 302, the intermediate model generator 208 may adjust the input data dimension of the convolutional layer indicated by the graphical element 304 to the data dimension of the input layer. Then, the intermediate model generator 208 may also validate whether the output data dimension of the convolutional layer matches with the input data dimension of the next layer.

The deep learning framework may provide an interface for multiple programming languages to support deep learning programs in different programming languages. In some implementations, the intermediate representation may also be independent of the programming language supported by the deep learning framework.

Subsequently, the intermediate representation may be provided to a target code generator 210. For each supported deep learning framework, the target code generator 210 can generate training and/or inferential programs and code, such as TensorFlow Code 212, PyTorch Code 214 or CNTK Code 216 etc. For example, the developers may select a target deep learning framework and the target code generator 210 may generate code for this target deep learning framework based on a predetermined rule. The target code generator 210 for example may convert each node of the intermediate representations into a predefined code corresponding to the node under the target deep learning framework.

In some implementations, the developers may change from this target deep learning framework to a further target deep learning framework. The target code generator 210 may then determine code for the further target learning framework based on the intermediate representation of the artificial neural network. In this way, switching between different deep learning frameworks can be readily carried out.

In some implementations, the visual model and the corresponding code may be displayed in parallel on the interface. For example, the interface may simultaneously display the canvas and the code portion, wherein the code my further include code stub(s) or editable area allowing the users to customize their own training metrics for the artificial neural network to replace common metrics like loss and accuracy etc.

As shown in FIG. 2, a job submitter 220 may receive code 212, 214 or 216 and input data 218 and submit the generated programs to the local host 222, cloud 224 or cloud 226 for training or inference. The cloud 224 and 226 may deploy a deep learning cloud platform (also known as machine learning cloud platform) for executing the code or programs. In addition, the programs also may be submitted to a remote work station for execution.

During training, a metric chart also may be rendered in real time on the interface for the training of the artificial neural network, i.e., plotting changes of the metric values during training. In this way, the developers can easily observe the training process and debug the artificial neural network and/or its training procedure. The users can conveniently decide whether the operation continues or terminates ahead of time by checking the execution progress and operation indicators or metrics in real time.

For example, the job submitter 220 may be provided with one-click job submission and may also be integrated with the integrated development environment of AI. Therefore, the training code can be run locally or on cloud.

The visual programming tool provided by implementations of the present disclosure can aggregate data preprocessing, deep learning model design and job submission/management into a complete pipeline. The visual programming tool provides model building, training and inference functions through a simple user interface and allows the users to design the model by dragging and dropping the deep learning layers in a simple and visual way. Thus, the development procedure of deep learning can be greatly simplified.

This tool can automatically generate training code to enable the users to train the model in accordance with a visual model. In addition, the tool can automatically synchronize the visual model representation with the generated code. When the users modify the visual model representation or the code, the code and/or the visual model representation are automatically updated.

Figure 4:
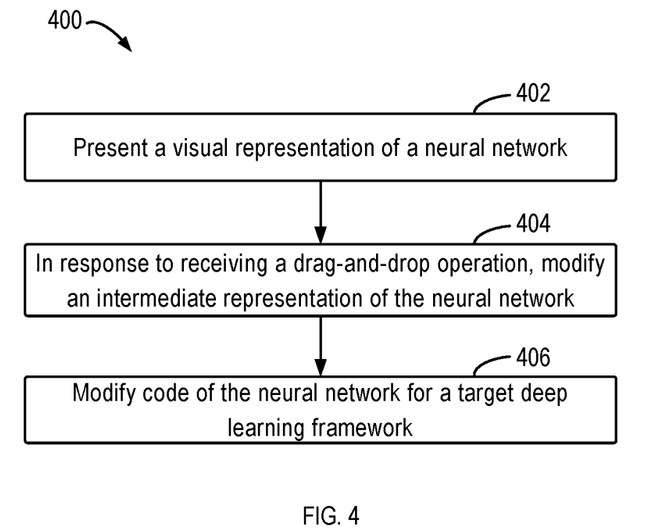
FIG. 4 illustrates a flowchart of a method for visual programming in accordance with implementations of the present disclosure.

FIG. 4 illustrates a flowchart of a method 400 of visual programming for deep learning in accordance with some implementations of the present disclosure. The method 400 may be executed at the visual programming module 122 as shown in FIG. 1 or in the form of the architecture 200 shown in FIG. 2.

The visual representation of the artificial neural network is displayed at 402, for example, the visual representation 300 of FIG. 3. The visual representation 300 includes graphical elements representing layers of the artificial neural network, such as graphical elements 302-310.

At 404, when the users (e.g., developers) edit the visual representation 300, for example, drag-and-drop the graphical elements, the intermediate representation of the artificial neural network may be modified to indicate the connections between the graphical elements modified by the drag-and-drop operation, wherein the intermediate representation of the artificial neural network is independent of the deep learning framework.

At 406, the code of the artificial neural network for the target deep learning framework is modified based on the intermediate representation of the artificial neural network.

In some implementations, the method 400 further includes modifying the intermediate representation of the artificial neural network in response to an editing operation on the code; and adjusting the visual representations of the artificial neural network based on the modified intermediate representation.

In some implementations, the method 400 further includes in response to receiving the drag-and-drop operation on the graphical element, validating whether the shapes of the layers of the artificial neural network match with one another.

In some implementations, the method 400 further includes in response to receiving a search operation associated with a keyword, displaying graphical elements representing at least one candidate layer corresponding to the keyword; and in response to receiving a selection of a graphical element of the at least one candidate layer, adding the selected graphical element to the visual representation.

In some implementations, the method 400 further includes displaying code stubs for customizing metrics of the artificial neural network; and in response to an editing operation on the code stubs, customizing the metrics of the artificial neural network.

In some implementations, the drag-and-drop operation is executed to enable at least one of: adding, into the visual representation, one or more new graphical elements representing one or more layers of an artificial neural network; deleting, from the visual representation, one or more graphical elements representing one or more layers of the artificial neural network; and modifying one or more parameters of one or more graphical elements representing one or more layers of an artificial neural network.

In some implementations, the method 400 further includes in response to receiving an instruction for changing the target deep learning framework to a further target deep learning framework, determining the code of the artificial neural network for the further deep learning framework based on intermediate representation of the artificial neural network.

Some exemplary implementations of the present disclosure are listed below.

In a first aspect, there is provided a computer-implemented method. The method comprises presenting a visual representation of an artificial neural network, the visual representation comprising graphical elements representing layers of the artificial neural network; in response to receiving a drag-and-drop operation on the graphical elements, modifying an intermediate representation of the artificial neural network, wherein the intermediate representation is independent of a deep learning framework and the drag-and-drop operation is configured to modify connections between the graphical elements; and modifying, based on the intermediate representation of the artificial neural network, code of the artificial neural network for a target deep learning framework.

In some implementations, the method comprises in response to an editing operation on the code, modifying the intermediate representation of the artificial neural network; and adjusting the visual representation of the artificial neural network based on the modified intermediate representation.

In some implementations, the method comprises in response to receiving the drag-and-drop operation on the graphical elements, validating dimensions of data associated with the layers of the artificial neural network.

In some implementations, the method comprises in response to receiving a search operation associated with a keyword, presenting graphical elements representing at least one candidate layer corresponding to the keyword; and in response to receiving a selection of graphical elements of the at least one candidate layer, adding the selected graphical elements to the visual representation.

In some implementations, the method further comprises presenting code stubs for customizing metrics of the artificial neural network; and in response to an editing operation on the code stubs, customizing the metrics of the artificial neural network.

In some implementations, the method further comprises modifying the intermediate representation of the artificial neural network in response to at least one of: adding, into the visual representation, a new graphical element representing a layer of the artificial neural network; deleting, from the visual representation, a graphical elements representing a layer of the artificial neural network; and modifying parameters of a graphical element representing a layer of the artificial neural network.

In some implementations, the method further comprises in response to receiving an instruction for changing the target deep learning framework to a further target deep learning framework, determining code of the artificial neural network for the further deep learning framework based on the intermediate representation of the artificial neural network.

In a second aspect, there is provided a device comprising: a processing unit; and a memory coupled to the processing unit and having instructions stored thereon, the instructions, when executed by the processing unit, causing the device to perform acts comprising: presenting a visual representation of an artificial neural network, the visual representations including graphical elements representing layers of the artificial neural network; in response to receiving a drag-and-drop operation on the graphical elements, modifying an intermediate representation of the artificial neural network, wherein the intermediate representation is independent of a deep learning framework and the drag-and-drop operation is configured to modify connections between the graphical elements; and modifying, based on the intermediate representation of the artificial neural network, code of the artificial neural network for a target deep learning framework.

In some implementations, the acts further comprise: in response to an editing operation on the code, modifying the intermediate representation of the artificial neural network; and adjusting, based on the modified intermediate representation, the visual representation of the artificial neural network.

In some implementations, the acts further comprise: in response to receiving the drag-and-drop operation on the graphical elements, validating dimensions of data associated with the layers of the artificial neural network.

In some implementations, the acts further comprise: in response to receiving a search operation associated with a keyword, presenting graphical elements representing at least one candidate layer corresponding to the keyword; and in response to receiving a selection of graphical elements of the at least one candidate layer, adding the selected graphical elements to the visual representation.

In some implementations, the acts further comprise: presenting code stubs for customizing metrics of the artificial neural network; and in response to an editing operation on the code stubs, customizing the metrics of the artificial neural network.

In some implementations, the acts further comprise: modifying the intermediate representation of the artificial neural network in response to at least one of: adding, into the visual representation, a new graphical element representing a layer of the artificial neural network; deleting, from the visual representation, a graphical element representing a layer of the artificial neural network; and modifying parameters of a graphical element representing a layer of the artificial neural network.

In some implementations, the acts further comprise: in response to receiving an instruction for changing the target deep learning framework to a further target deep learning framework, determining code of the artificial neural network for the further deep learning framework based on the intermediate representation of the artificial neural network.

In a third aspect, the present disclosure provides a computer program product tangibly stored in a non-transitory computer storage medium and including computer-executable instructions, wherein the computer-executable instructions, when executed by a device, cause the device to perform the method of the first aspect.

In a fourth aspect, the present disclosure provides a computer-readable storage medium with computer-executable instructions stored thereon, wherein the computer-executable instructions, when executed by a device, cause the device to perform the method of the first aspect.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the present disclosure may be written in any combination of one or more programming languages. These program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the shown particular order or in a sequential order, or all shown operations are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
   presenting a visual representation of an artificial neural network, wherein the visual representation of the artificial neural network includes graphical elements representing layers of the artificial neural network;
   in response to receiving a drag-and-drop operation on the graphical elements, modifying an intermediate representation of the artificial neural network, wherein the intermediate representation of the artificial neural network is independent of a deep learning framework and the drag-and-drop operation is configured to modify connections between the graphical elements including automatically connecting a first graphical element to a second graphical element of the graphical elements;
   modifying, based on the intermediate representation of the artificial neural network, code of the artificial neural network for a target deep learning framework; and
   in response to receiving an instruction for changing the target deep learning framework to a further target deep learning framework, determining code of the artificial neural network for the further target deep learning framework based on the intermediate representation of the artificial neural network.

2. The computer-implemented method of claim 1, further comprising:
   in response to an editing operation on the code of the artificial neural network for the target deep learning framework, modifying the intermediate representation of the artificial neural network; and
   adjusting the visual representation of the artificial neural network based on the modified intermediate representation of the artificial neural network.

3. The computer-implemented method of claim 1, further comprising:
   in response to receiving the drag-and-drop operation on the graphical elements, validating dimensions of data associated with the layers of the artificial neural network.

4. The computer-implemented method of claim 1, further comprising:
   in response to receiving a search operation associated with a keyword, presenting graphical elements representing at least one candidate layer corresponding to the keyword; and
   in response to receiving a selection of graphical elements of the at least one candidate layer, adding the selected graphical elements of the at least one candidate layer to the visual representation of the artificial neural network.

5. The computer-implemented method of claim 1, further comprising:
   presenting code stubs for customizing metrics of the artificial neural network; and
   in response to an editing operation on the code stubs, customizing the metrics of the artificial neural network.

6. The computer-implemented method of claim 1, further comprising:
   modifying the intermediate representation of the artificial neural network in response to at least one of:
   adding, into the visual representation of the artificial neural network, a new graphical element representing a layer of the artificial neural network;
   deleting, from the visual representation of the artificial neural network, a graphical element representing a layer of the artificial neural network; and
   modifying parameters of a graphical element representing a layer of the artificial neural network.

7. A device comprising:
   a processing unit; and
   a memory coupled to the processing unit and having instructions stored thereon, the instructions, when executed by the processing unit, causing the device to perform acts comprising:
   presenting a visual representation of an artificial neural network, wherein the visual representation of the artificial neural network includes graphical elements representing layers of the artificial neural network;

in response to receiving a drag-and-drop operation on the graphical elements, modifying an intermediate representation of the artificial neural network, wherein the intermediate representation of the artificial neural network is independent of a deep learning framework and the drag-and-drop operation is configured to modify connections between the graphical elements including automatically connecting a first graphical element to a second graphical element of the graphical elements;

modifying, based on the intermediate representation of the artificial neural network, code of the artificial neural network for a target deep learning framework; and in response to receiving an instruction for changing the target deep learning framework to a further target deep learning framework, determining code of the artificial neural network for the further target deep learning framework based on the intermediate representation of the artificial neural network.

8. The device of claim 7, wherein the acts further comprise:

in response to an editing operation on the code of the artificial neural network for the target deep learning framework, modifying the intermediate representation of the artificial neural network; and adjusting the visual representation of the artificial neural network based on the modified intermediate representation of the artificial neural network.

9. The device of claim 7, wherein the acts further comprise:

in response to receiving the drag-and-drop operation on the graphical elements, validating dimensions of data associated with the layers of the artificial neural network.

10. The device of claim 7, wherein the acts further comprise:

in response to receiving a search operation associated with a keyword, presenting graphical elements representing at least one candidate layer corresponding to the keyword; and in response to receiving a selection of graphical elements of the at least one candidate layer, adding the selected graphical elements of the at least one candidate layer to the visual representation of the artificial neural network.

11. The device of claim 7, wherein the acts further comprise:

presenting code stubs for customizing metrics of the artificial neural network; and in response to an editing operation on the code stubs, customizing the metrics of the artificial neural network.

12. The device of claim 7, wherein the acts further comprise:

modifying the intermediate representation of the artificial neural network in response to at least one of:

adding, into the visual representation of the artificial neural network, a new graphical element representing a layer of the artificial neural network;

deleting, from the visual representation of the artificial neural network, a graphical element representing a layer of the artificial neural network; and modifying parameters of a graphical element representing a layer of the artificial neural network.

13. A computer program product stored in a non-transitory computer storage medium and comprising computer-executable instructions which, when executed by a device, cause the device to perform acts comprising:

presenting a visual representation of an artificial neural network, wherein the visual representation of the artificial neural network includes graphical elements representing layers of the artificial neural network;

in response to receiving a drag-and-drop operation on the graphical elements, modifying an intermediate representation of the artificial neural network, wherein the intermediate representation of the artificial neural network is independent of a deep learning framework and the drag-and-drop operation is configured to modify connections between the graphical elements including automatically connecting a first graphical element to a second graphical element of the graphical elements;

modifying, based on the intermediate representation of the artificial neural network, code of the artificial neural network for a target deep learning framework; and in response to receiving an instruction for changing the target deep learning framework to a further target deep learning framework, determining code of the artificial neural network for the further target deep learning framework based on the intermediate representation of the artificial neural network.

* * * * *